(12) United States Patent
Bundo

(10) Patent No.: US 7,036,768 B2
(45) Date of Patent: May 2, 2006

(54) MULTI-PURPOSE AIRSHIP

(76) Inventor: Mutsuro Bundo, 1238-4, Oaza Miyoshi, Oita-shi, Oita-ken (JP)

( * ) Notice: Subject to any disclaimer, the term of this patent is extended or adjusted under 35 U.S.C. 154(b) by 80 days.

(21) Appl. No.: 10/902,136

(22) Filed: Jul. 30, 2004

(65) Prior Publication Data

US 2005/0279880 A1 Dec. 22, 2005

(30) Foreign Application Priority Data

Jun. 18, 2004 (JP) .............................. 2004-180560

(51) Int. Cl.
*B64B 1/20* (2006.01)
(52) U.S. Cl. .................... 244/5; 244/6; 244/25; 244/26
(58) Field of Classification Search .................. 244/25, 244/1 R, 26, 27, 29, 30, 31, 24, 17.15, 17.23, 244/6, 5
See application file for complete search history.

(56) References Cited

U.S. PATENT DOCUMENTS 932,712 A * 8/1909 Le Fevre ..................... 244/26

FOREIGN PATENT DOCUMENTS

GB 2030098 A * 5/1979

* cited by examiner

*Primary Examiner*—Peter M. Poon
*Assistant Examiner*—T D. Collins
(74) *Attorney, Agent, or Firm*—Wenderoth, Lind & Ponack, L.L.P.

(57) ABSTRACT

A multi-purpose airship usable for multi-purposes with less maintenance cost is provided. The multi-purpose airship comprises an operator cabin (1) to which a work device of agricultural chemical scattering device (10) or the like is fittable, a rotor (4) fitted to a top of the operator cabin (1) and having rotor blades of plural stages (or coaxial rotors) of which fitting angle (or pitch) is adjustable to generate a lifting force and propulsive force, a balloon (5) detachably fitted to a top of the rotor (4) and filled with gas lighter than air to generate a lifting force, a stabilizing wing (2) elongating horizontally from each side of the operator cabin (1) and a propulsion device (3) comprising a propeller device or jet engine fitted to a distal end of the stabilizing wing (2) to vary a thrust direction between the horizontal direction and the vertical direction.

5 Claims, 2 Drawing Sheets

MULTI-PURPOSE AIRSHIP

BACKGROUND OF THE INVENTION

1. Field of the Invention

The present invention relates to a multi-purpose airship constructed to be usable for various purposes, such as for an amusement, home use, commercial use, life saving, photographing, exploration, transportation, etc.

2. Description of the Prior Art

In the prior art, while there are proposed various airships, airplanes, helicopters, etc. for various purposes, such as for a life saving, photographing, agricultural chemical scattering, fire fighting, amusement, etc., these means are developed for the respective separate purposes. Hence, there is a problem that their area of use is limited to thereby invite a less availability as well as a high cost of manufacture and maintenance.

As examples of a prior art airship, the Japanese laid-open patent application 1987-18397 discloses a remote operated airship comprising a balloon filled with gas lighter than air and propeller devices of two kinds, one for propulsion and one for ascending/descending. Also, the Japanese laid-open patent application 1993-221386 discloses a remote operated airship comprising a balloon and two propeller devices arranged on both sides of the airship to be independently tiltable around respective axes so that the propeller devices can change their direction for advancing, ascending/descending and turning.

The airships of these examples are remotely operated unmanned airships of medium size or small size that are provided with the balloon for continuously obtaining a lifting force, so that their area of use is limited to a show event, advertisement, amusement or the like and by no means appropriate for a life saving, exploration, transportation or the like.

Conventionally, for the purpose of life saving, exploration, transportation or the like, an airplane and a helicopter are exclusively used. In the airplane and helicopter, however, an engine is used as a power source for both of the lifting force and the propulsive force, so that energy consumption is large and operation cost is also large. As a conventional multi-purpose means, only a helicopter having limited combined purposes at most of a fire fighting, disaster rescue and first aid is provided.

As mentioned above, in the prior art airship, airplane and helicopter, there is a problem that their area of use is limited to lead to a less availability and this invites a high cost of manufacture and maintenance.

SUMMARY OF INVENTION

In view of the above-mentioned problem in the prior art airship, airplane and helicopter, it is an object of the present invention to provide a multi-purpose airship that is usable for multi-purposes with less maintenance cost.

In order to achieve the above-mentioned object, the present invention provides a multi-purpose airship comprising an operator cabin constructed such that a work device of an agricultural chemical scattering device or the like can be fitted thereto, a rotor fitted to a top portion of the operator cabin and having rotor blades of plural stages of which a fitting angle is adjustable so that both of a lifting force and a propulsive force are generated, a balloon detachably fitted to a top portion of the rotor and filled with gas lighter than air so that a lifting force is generated, a stabilizing wing elongating substantially horizontally from each side of the operator cabin and a propulsion device comprising a propeller device or a jet engine fitted to a distal end portion of the stabilizing wing so that a thrust direction thereof is variable between the horizontal direction and the vertical direction.

In the multi-purpose airship of the present invention, the propulsion device may be constructed to be detachably fitted to the stabilizing wing and as the propulsion device, a plurality of propeller devices or jet engines of which a fitting angle is adjustable may be provided to be selected according to the purpose of use.

The balloon fitted to the multi-purpose airship of the present invention may be made of a material of a hard type, semi-hard type or soft type.

Also, the balloon fitted to the multi-purpose airship of the present invention may be formed in a spherical shape, fusiform shape or other shapes and further may be fitted rotatably relative to the operator cabin.

According to the multi-purpose airship of the present invention, the balloon is made detachable. Thereby, the balloon to be fitted can be selected from those made of an appropriate material, made in an appropriate shape and/or applied with an appropriate marking according to the purpose of use. Also, if the airship is to be used for a high speed flying as a transportation means, the balloon can be detached so that the high speed flying becomes possible.

Also, according to the multi-purpose airship of the present invention, the balloon can be employed from those made of a material of a hard type, semi-hard type or soft type. Thereby, if the balloon is removed from the airship, the balloon can be folded so as to be easily put aside. Further, the balloon can be appropriately employed from those made in a spherical shape, fusiform shape or other shapes. Thereby, the multi-purpose use can be realized, such as for a commercial purpose of advertisement, etc., amusement purpose or the like.

Also, by employing the structure that the balloon is made rotatable relative to the cabin, the entire marking of the balloon can be seen from all the directions around the airship.

In the multi-purpose airship according to the present invention, the main part of the lifting force can be given by the balloon that is filled with the gas lighter than air. Hence, the operation cost becomes less. If the lifting force is insufficient, the fitting angle of the rotor blades of the up and down plural stages is controlled so as to generate an upward thrust so that the lifting force can be made up. If a further larger lifting force is needed, the direction of the propulsion device comprising the plural propeller devices fitted to the distal end portion of the stabilizing wing on each side of the cabin is controlled so as to generate an upward thrust and thereby the necessary lifting force can be obtained.

Also, in the multi-purpose airship according to the present invention, if the airship is to be propelled, the fitting angle of the rotor blades of the up and down plural stages is controlled so as to generate a propulsive thrust so that the necessary propulsive force can be obtained. If a larger propulsive force beyond the thrust of the rotor is needed, the direction of the propulsion device fitted to the distal end portion of the stabilizing wing is controlled so as to generate a propulsive thrust. Thus, by using the propulsive force generated by both of the rotor and the propulsion device, a high speed flying becomes possible and an emergency case including a first aid can be dealt with.

While the airship of the present invention is being propelled, a lift is generated by the stabilizing wing and thereby a stability of attitude of the airship can be maintained. Also, by fitting the plural propulsion devices to the distal end portion of the stabilizing wing, a large propulsive force and lifting force can be obtained.

In this way, according to the multi-purpose airship of the present invention, the three units of the balloon, the rotor having the rotor blades of the up and down plural stages of which the fitting angle is variable and the propulsion device are selectively used so that a lifting force necessary for the purpose of use can be obtained. Also, the two units of the rotor and the propulsion device are selectively used so that a propulsive force necessary for the purpose of use can be obtained.

Moreover, according to the multi-purpose airship of the present invention, such a work device as an agricultural chemical scattering device, fire extinguishing agent scattering device or the like can be fitted to the cabin. Hence, by exchanging the work devices, work of various kinds can be dealt with.

While the airship of the present invention is constructed to be usable for the multi-purposes, the propeller devices, jet engines or the like used for propulsion of the airship are not required to be tailored but may be appropriately employed from the usual propulsion devices.

DESCRIPTION OF THE PREFERRED EMBODIMENTS

Herebelow, the present invention will be described more concretely based on embodiments of a multi-purpose airship according to the present invention with reference to the appended drawings.

FIRST EMBODIMENT

Figure 1:
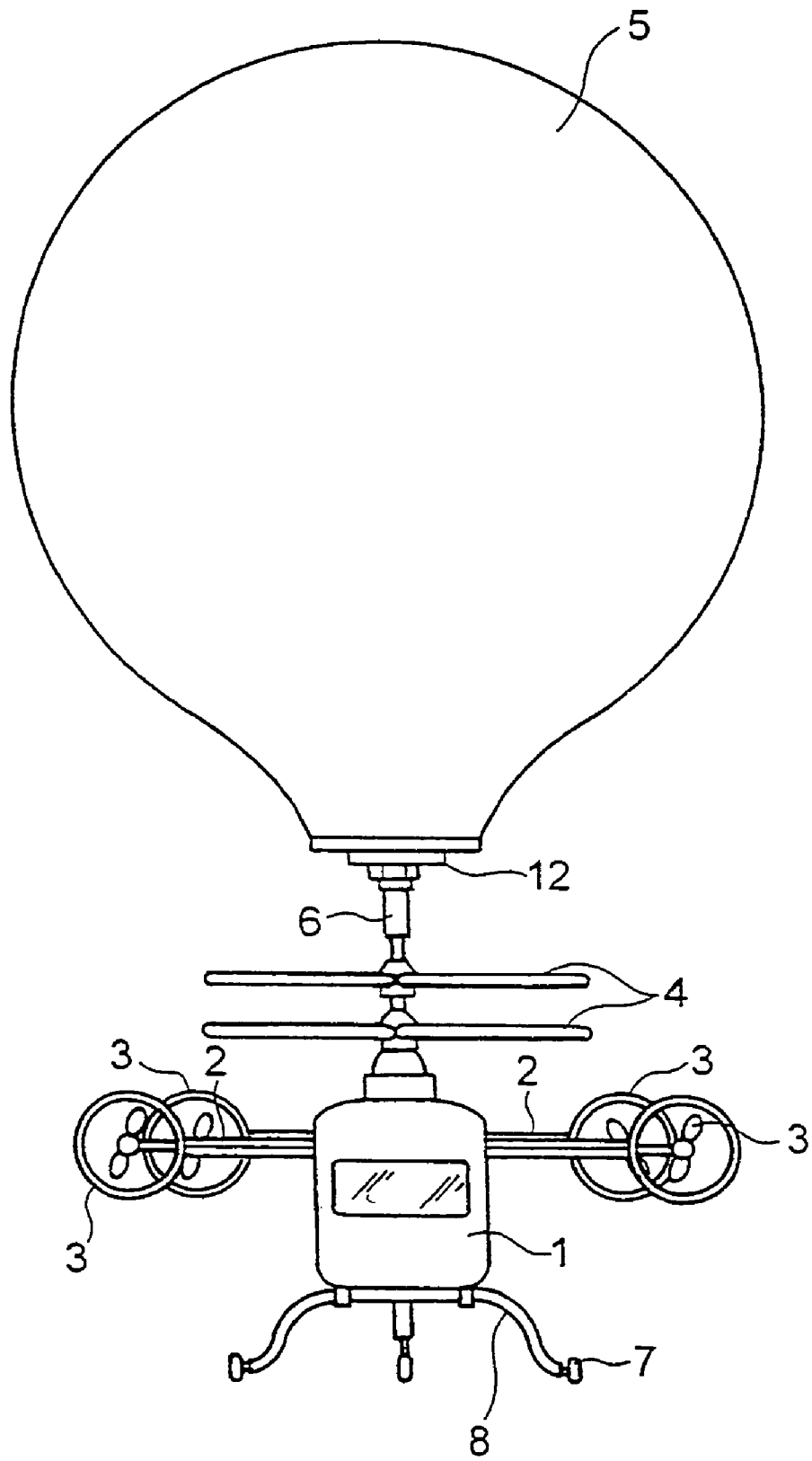
FIG. 1 is a constructional view of a multi-purpose airship of a first embodiment according to the present invention.

A multi-purpose airship of a first embodiment will be described with reference to FIG. 1. In FIG. 1, numeral 1 designates a cabin that comprises, like in a usual airplane or helicopter, an entrance through which an operator gets on or gets off, a loading/unloading port through which articles are loaded or unloaded and a seat on which the operator sits as well as comprises a window through which the operator sees the outside scene. A stabilizing wing 2 is fitted to each side of the cabin 1 so as to elongate therefrom substantially horizontally in the rightward and leftward directions as shown in FIG. 1. While flying, the stabilizing wing 2 functions to generate a lift so as to maintain a stability of attitude of the airship. A propulsion device 3 is detachably fitted to a distal end portion of each of the right-hand side and left-hand side stabilizing wings 2. The propulsion device 3 is fitted so that a thrust direction thereof can be adjusted between the horizontal direction and the vertical direction.

As the propulsion device 3, an appropriate propulsion device, such as a propeller device or jet engine of which a thrust direction is variable, may be employed and the construction thereof is made such that one or more of the propulsion devices are selected and fitted according to the purpose of use or one or more of the propulsion devices are selected and fitted as a replacement of the existing propulsion devices according to the purpose of use. The fitting structure thereof can be appropriately selected from the conventional art and detailed description thereon will be omitted.

It is to be noted that the airship illustrated in FIG. 1 has two propeller devices as the propulsion device 3 fitted to the distal end portion of each of the stabilizing wings 2 but the construction may also be made such that one propulsion device only or three or more propulsion devices are provided to be fitted to each of the stabilizing wings 2 so that a lifting force and propulsive force of needed magnitude according to the purpose of use can be obtained.

The cabin 1 has its upper portion provided with a rotor 4 having rotor blades of two stages lapped one on another in the vertical direction. The rotor 4 may be such one as usually used in a helicopter and has a fitting angle of the rotor blades made adjustable as well as has three rotor blades for each stage, for example. By changing the fitting angle of the rotor blades, a lifting force is generated as well as a propulsive force can be generated in the frontward, rearward and sideward directions. It is to be noted that while the illustration shows the example in which the rotor 4 is provided having the rotor blades of the up and down two stages, the rotor blades may be provided in three or more stages so that a lifting force and propulsive force of needed magnitude according to the purpose of use can be obtained.

A balloon 5 in which gas lighter than air is appropriately enclosed is fitted to a top portion of the rotor 4 detachably via a fitting shaft 6. The balloon 5 may be constructed by a material of a hard type, semi-hard type or soft type and preferably is foldable so as to be easily put aside, when detached.

The balloon 5 may be formed in a spherical shape, fusiform shape or other appropriate shapes and may be applied with marking of a commercial advertisement. Or the balloon 5 may be formed in such a shape, and applied with such a color or marking, as are able to increase a joy of vacation time. Also, the balloon 5 may be fitted to the fitting shaft 6 via a rotatable member 12 that is rotatable relative to the cabin 1 mechanically or by making use of a drive force of the propulsive force so that the entire marking of the balloon 5 can be seen from all the directions around the airship.

It is preferable if a variety of the balloons 5 are prepared having various shapes, colors, patterns and markings to be used detachably corresponding to the purpose of use.

In FIG. 1, numeral 7 designates a landing wheel that is fitted to the cabin 1 by an appropriate structure, such as a fitting member 8.

It is to be noted that as to handling the gas of the balloon 5, there is no specific limitation but the handling may be appropriately selected corresponding to the purpose and place of use, for example, the balloon 5 may be filled with the gas after the balloon 5 is fitted to the rotor 4 via the fitting shaft 6 and also, if the balloon 5 is to be detached, the gas may be first drawn out of the balloon 5.

According to the airship of FIG. 1 as described above, the main part of the lifting force is given by the balloon 5 in which the gas lighter than air is filled and hence the operation cost can be largely saved. If the lifting force of the balloon is insufficient, the fitting angle of the rotor 4 having the rotor blades of the two stages is selected to increase the lifting force and thereby the lifting force can be made up. If a further larger lifting force is needed for such a work as to suspend a heavy article, the propulsion device 3 comprising the propeller devices fitted to the distal end portion of the stabilizing wing 2 is controlled to be directed to increase an upward thrust so that the necessary lifting force can be obtained by the upward thrust generated by the propulsion device 3.

Also, if the airship is to be propelled in the horizontal direction, the propulsion device 3 fitted to the distal end portion of the stabilizing wing 2 is controlled to be directed to the horizontal direction so that a thrust generated by the propulsion device 3 can be used as the propulsive force. If the airship is needed to be propelled in a velocity beyond the capacity of the propulsion device 3, the fitting angle of the rotor blades is selected to increase the propulsive force and thereby both of the thrust generated by the propulsion device 3 and the propulsive force generated by the rotor 4 can be used so that a high speed flying becomes possible.

If the balloon 5 is obstructive for the high speed flying, the balloon 5 that is detachably fitted can be detached so that the high speed flying becomes possible. In this case, the lifting force of the airship can be given by the lift generated by both of the rotor 4 and the stabilizing wing 2.

Also, if a work device, such as an agricultural chemical scattering device, fire extinguishing agent scattering device, etc., is appropriately selected to be fitted to the cabin 1, then the airship can be used to be applied to work of various kinds.

SECOND EMBODIMENT

Figure 2:
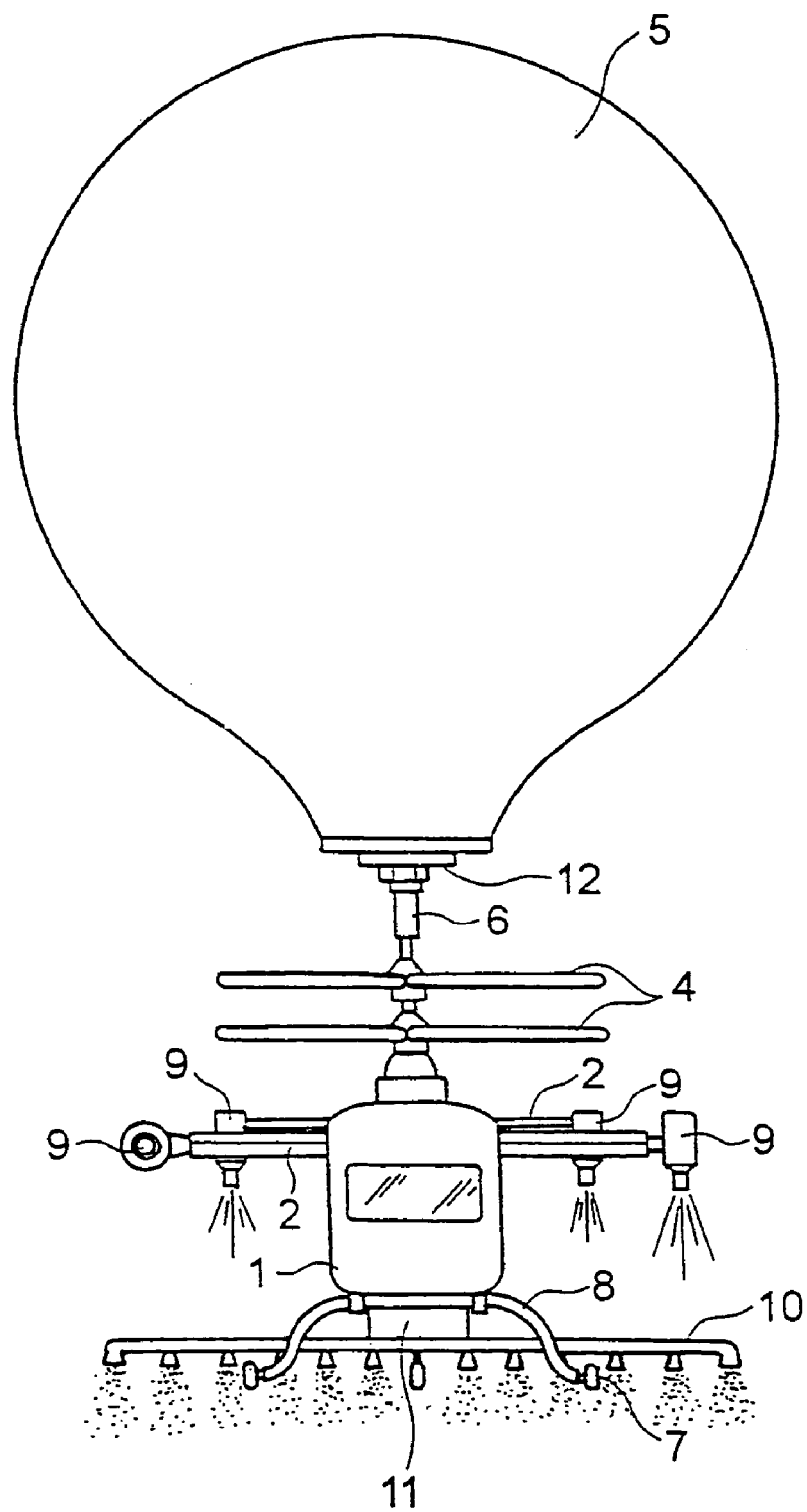
FIG. 2 is a constructional view of a multi-purpose airship of a second embodiment according to the present invention.

A multi-purpose airship of a second embodiment will be described with reference to FIG. 2. In FIG. 2, numeral 9 designates a jet engine that is provided in place of the propeller device as the propulsion device 3 of the first embodiment shown in FIG. 1. Like in the case of the first embodiment, the jet engine 9 is detachably fitted to each of the stabilizing wings 2 so as to be replaceable with other propulsion devices. The jet engine 9 is fitted so that a thrust direction thereof can be adjusted to be directed between the horizontal direction and the vertical direction.

The airship illustrated in FIG. 2 has two jet engines 9 fitted to a distal end portion of each of the stabilizing wings 2 but the construction may also be made such that one jet engine 9 or three or more jet engines 9 are provided to the distal end portion of each of the stabilizing wings 2 so that a lifting force and propulsive force of needed magnitude according to the purpose of use can be obtained.

In FIG. 2, the two jet engines 9 on the right-hand side are in the state to effect jetting downwardly so as to generate an upward thrust. One of the two jet engines 9 on the left-hand side is in the state to effect jetting in the horizontal backward direction so as to generate a frontward thrust and the other jet engine 9 to effect jetting downwardly so as to generate an upward thrust. Thus, by the state of the jet engines 9 on the right-hand side, a maximum lifting force is generated and by the state of the jet engines 9 on the left-hand side, the propulsive force and the lifting force are sharedly generated by the two jet engines 9.

Numeral 10 designates a scattering device of agricultural chemicals fitted to the cabin 1. The scattering device 10 may be selected from the conventional ones appropriate for scattering agricultural chemicals of powder, liquid or the like according to the purpose of use, such as for destroying vermin, avoiding diseases of crops or the like. Numeral 11 designates a tank of agricultural chemicals fitted to the cabin 1 for storing agricultural chemicals to be scattered by the scattering device 10.

Constructions of other parts and components are substantially the same as those of the airship of the first embodiment shown in FIG. 1, so that they are designated with the same reference numerals and repeated description thereon will be omitted.

While the airship of the present second embodiment has the scattering device 10 fitted thereto for scattering agricultural chemicals, it is a matter of course that by appropriately replacing the scattering device 10 with other work devices, the airship can be used for multiple purposes like the airship of the first embodiment.

What is claimed is:

1. A multi-purpose airship comprising:
   an operator cabin constructed such that a work device can be fitted thereto;
   a rotor fitted to a top portion of said operator cabin and having rotor blades of plural stages of which a fitting angle is adjustable so that both of a lifting force and a propulsive force can be generated;
   a balloon detachably fitted to a top portion of said rotor and filled with gas lighter than air so that a lifting force can be generated;
   a stabilizing wing elongated substantially horizontally from each side of said operator cabin; and
   a propulsion device comprising a propeller device or a jet engine fitted to a distal end portion of said stabilizing wing so that a thrust direction thereof is variable between a horizontal direction and a vertical direction.

2. The multi-purpose airship as claimed in claim 1, wherein said propulsion device is detachably fitted to said stabilizing wing, and said propulsion device has an adjustable fitting angle.

3. The multi-purpose airship as claimed in claim 1, wherein said balloon is made of a material of a hard type, semi-hard type or soft type.

4. The multi-purpose airship as claimed in claim 1, wherein said balloon is formed in a spherical shape, fusiform shape or other shapes and is fitted rotatably relative to said operator cabin.

5. The multi-purpose airship as claimed in claim 3, wherein said balloon is formed in a spherical shape, fusiform shape or other shapes and is fitted rotatably relative to said operator cabin.

\* \* \* \* \*